United States Patent [19]

Bouton et al.

[11] 4,102,849

[45] Jul. 25, 1978

[54] OIL-EXTENDED HYDROGENATED DIBLOCK COPOLYMER

[75] Inventors: Thomas Chester Bouton, Akron; Shingo Futamura, Seville, both of Ohio

[73] Assignee: The Firestone Tire & Rubber Company, Akron, Ohio

[21] Appl. No.: 775,123

[22] Filed: Mar. 7, 1977

Related U.S. Application Data

[63] Continuation-in-part of Ser. No. 668,161, Mar. 18, 1976, abandoned, which is a continuation-in-part of Ser. No. 542,340, Jan. 20, 1975, abandoned.

[51] Int. Cl.$^2$ ............................................... C08K 5/01
[52] U.S. Cl. .......................... 260/33.6 AQ; 260/880 B
[58] Field of Search ................... 260/33.6 AQ, 880 B

[56] References Cited

U.S. PATENT DOCUMENTS

| | | | |
|---|---|---|---|
| 3,485,787 | 12/1969 | Haefele | 260/33.6 AQ |
| 3,823,203 | 7/1974 | De La Mare | 260/880 B |
| 3,827,999 | 8/1974 | Crossland | 260/33.6 AQ |
| 3,830,767 | 8/1974 | Condon | 260/33.6 AQ |

*Primary Examiner*—Paul R. Michl

[57] ABSTRACT

The composition disclosed herein involves an oil-extended composition comprising 10–200 parts of oil, preferably 25–125 parts, per 100 parts of a hydrogenated diblock copolymer comprising one block of polybutadiene and one block of a random copolymer of a vinyl arene, such as styrene, and butadiene. This hydrogenated diblock copolymer has improved properties as compared to corresponding hydrogenated random copolymers of the vinyl arene and butadiene, particularly with respect to high temperature properties, oil acceptance and stability against aging.

11 Claims, No Drawings

OIL-EXTENDED HYDROGENATED DIBLOCK COPOLYMER

This application is a continuation-in-part of application Ser. No. 668,161 filed Mar. 18, 1976, now abandoned, which in turn is a continuation-in-part of application Ser. No. 542,340 filed Jan. 20, 1975, now abandoned.

BACKGROUND OF THE INVENTION

1. Field of the Invention

This invention relates to oil-extended hydrogenated diblock copolymers. More specifically it relates to oil-extended hydrogenated copolymers of a diblock of polybutadiene and a random copolymer of a vinyl arene and butadiene.

2. Related Prior Art

Hydrogenation of polybutadiene and of random copolymers of styrene and butadiene, as well as blends of the two hydrogenated products, do not give the thermoplastic, high temperature properties and oil acceptance desired for certain purposes. Attempts to improve these properties have resulted in the sacrifice of other desirable properties. For example, with a thermoplastic hydrogenated random copolymer of styrene and butadiene used for molding shoe soles, attempts to improve the high temperature properties by increasing the molecular weight have resulted in poor mold flow. In turn, lowering the molecular weight to improve mold flow has resulted in poor hot tensile strength. Moreover the addition of oil to improve mold flow is not practical because of the poor oil acceptability of the resin.

U.S. Pat. No. 3,598,886 discloses hydrogenated block copolymers comprising the hydrogenated product from a block copolymer consisting of a plurality of alternate blocks of polybutadiene and polystyrene.

U.S. Pat. No. 2,864,800 shows hydrogenated polybutadiene. U.S. Pat. No. 3,634,540 teaches hydrogenated block copolymers of the structure $(A-B)_{1-5} - (B-A)_{1-5}$ wherein A represents a polybutadiene block and B represents a random copolymer block of a vinyl arene and a diene in which 35–55% of its condensed units have a side chain such as methyl or ethyl. As will be noted there are two terminal hydrogenated polybutadiene blocks in the product.

British Pat. No. 1,151,598 describes a hydrogenation process used on various hydrocarbon polymers among which are included polybutadiene and copolymers of butadiene and styrene, both random and block copolymers. However, there is no teaching of a combination of blocks of polybutadiene and of random copolymer of styrene and butadiene.

Moreover, none of the products described in these prior art references show the high temperature tensile strength desired in molding compositions without sacrifice of other desirable properties.

STATEMENT OF THE INVENTION

In accordance with the present invention, it has been found that molding compositions of the desired tensile strength at high temperatures together with other desirable properties may be made of an oil-extended hydrogenated diblock copolymer consisting of one block of polybutadiene and one block of a random copolymer of a vinyl arene, such as styrene, and 1,3-butadiene, wherein the polybutadiene block represents 20–70% by weight and the random copolymer portion has 20–70% of styrene and represents 30–80% of the diblock copolymer which has an overall molecular weight in the range of 15,000 to 1,000,000, preferably 20,000 to 500,000. In addition to the good hot tensile strength, these diblock copolymers have good oil acceptance or extendability, adhesion, mold flow, modulus, flexural strength, stability against heat and aging, etc.

Vinyl arenes suitable for use in preparing the random copolymer blocks in the diblock copolymer of this invention include any vinyl or alphamethyl vinyl arene compounds capable of being polymerized by an anionic initiator. Particularly useful as co-monomers for this purpose are vinyl aryl and alpha-vinyl aryl compounds such as styrene, alphamethyl styrene, vinyl toluene, vinyl napthalene, alphamethylvinyl toluene, vinyl diphenyl, and corresponding compounds in which the aromatic nucleus may have other alkyl derivatives up to a total of 8 carbon atoms or may have chlorine attached to the aromatic nucleus such as p-chloro-styrene, m-chloro-styrene, 4-chloro-1-vinyl-napthalene, etc.

In preparing the non-hydrogenated or starting diblock copolymer, various polymerization methods known in the art may be used. Preferably, the polybutadiene block is formed first and then, without deactivating the catalyst, the random copolymer block is formed directly thereon. Alternatively, however, the random copolymer block may be formed first and then, without deactivating the catalyst, the polybutadiene block may be formed directly thereon.

In a preferred modification the initial step comprises polymerization of butadiene with a lithium alkyl such as secondary or normal butyl lithium or other alkyl lithium compounds containing less than about 8 carbon atoms in the alkyl radical. Preferably an inert hydrocarbon solvent is used, such as an alkane, alkene, cycloalkane, cycloalkene or aromatic hydrocarbon. Typical solvents include butanes, pentanes, hexanes, cyclohexanes, benzene, toluene, xylenes, etc.

The initiator used in the polymerization is a compound containing a carbon-lithium or carbon-sodium linkage. This includes compounds corresponding to the formulas RLi and RNa, where R is an aliphatic, cycloaliphatic or aromatic hydrocarbon radical containing from 1 to 20 carbon atoms. Among the many compounds suitable for this purpose are methyllithium, ethyllithium, isopropyllithium, n-butyllithium, sec.-butyllithium, t-butyllithium, amyllithium, hexyllithium, p-octyllithium, n-decyllithium, cyclohexyllithium, allyllithium, methallyllithium, phenyllithium, napthyllithium, p-tolyllithium, p-butylphenyllithium, 4-phenylbutyllithium and the corresponding sodium compounds. Mixtures of two or more of the above may be used. Particularly preferred is n-butyllithium.

Initially a small amount of the initiator is preferably used to scavenge or neutralize impurities present in the solvent or monomer. Therefore, the amount of initiator used is that required for scavenging purpose plus the amount required to produce the desired molecular weight in the resultant polymer. Theoretically, each molecule of initiator over and above that used for scavenging, produces a molecule of polymer, so the initiator level should be the reciprocal of the desired molecular weight in moles of initiator per mole of reactive monomer. In general however, from 0.05 to 5 millimoles of initiator is required per mole of monomer to be polymerized, preferably from 0.1 to 2.5 millimoles of initiator per mole of monomer.

In the polymerization system it is especially important to exclude materials harmful to the initiator. These materials include water, oxygen, carbon dioxide and other similar materials which "kill" or deactivate the initiator. Preferably the incoming monomers and diluent are treated to remove such impurities prior to introduction to the polymerization system.

The diluent is advantageously an aliphatic hydrocarbon of 4–10 carbon atoms or an aromatic hydrocarbon of 6–10 carbon atoms which is inert to the initiator employed. The diluent can be one in which the polymer is soluble or partly soluble, or in which the polymer may be suspended. Pentanes, hexanes, heptanes, cyclohexane, cyclohexene, pentenes, hexenes, heptenes, benzene and toluene are preferred as diluents, especially hexanes and cyclohexanes. Mixtures of these may also be used.

From 200 to 900 parts by weight of diluent per 100 parts of monomer is generally sufficient to yield a fluid polymer solution or suspension which can be easily handled.

The temperature of the polymerization mass should be maintained between 0° and 175° C, preferably 50°–150° C.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

In one method of forming the random copolymer block, a styrene butadiene monomer mixture in the desired ratio is fed into the reactor at such a rate that as the butadiene is continuously consumed the styrene is also copolymerized in a random repeating unit arrangement. This polymerization rate is affected by a number of factors, including the temperature, the solvent or diluent, the ratio of styrene to butadiene, the specific type of catalyst used, and the concentration of catalyst. It is also very important to have very efficient agitation to provide homogeneity and intimate contact of the various components.

The polymerization rate is easily measured once these various factors have been determined. For example, a solution of styrene and butadiene in the desired proportions is made in a selected diluent and catalyst is added. Then the mixture is agitated while aliquot portions are removed and inserted in polymerization bottles and individually sealed. A number of these polymerization bottles are placed in a polymerization bath and maintained at identical conditions for varying periods of time. The individual bottles are each removed at the appropriate time. After stopping the polymerization therein by cooling and adding a stopping agent such as alcohol, the solvent is vaporized and the residue of polymer is weighed and analyzed for butadiene and styrene content. In this way the amount of polymer produced over various periods of time is easily determined and the rate of butadiene and styrene polymerization for this particular set of conditions can be calculated. A curve can be plotted to represent this rate of polymerization.

When the monomer mixture feed rate is maintained well below, and preferably less than half the polymerization rate for the particular conditions being used, random copolymerization is effected. Random copolymerization may also be assured by adding all of the styrene initially to the polymerization system containing the initiator, preferably in the form of the polybutadiene-Li and then adding the butadiene gradually at about or less than the rate at which it is being polymerized. Then with the system being maintained deficient in butadiene because it is being polymerized as fast as it is being fed into the system, the styrene is copolymerized to form the random copolymer block. After the butadiene is all added and polymerized, the remaining styrene monomer is swept from or otherwise removed from the system to avoid the formation of a terminal block of polystyrene. If the amount of styrene remaining is small, it may be polymerized since a very small terminal block of polystyrene will not be harmful. Up to 10% block polystyrene may be tolerated in the copolymer without harmful effects on the properties, and preferably there is no more than 5%.

Inasmuch as the solvent and other factors will exert an influence upon the microstructure of the diene units, control of the geometric isometry of the diene sequences in the block polymer is also possible. The microstructure of the basic non-hydrogenated polymer is important because it influences the properties of the resulting fully hydrogenated block copolymers. For example, block sequences derived from butadiene polymerized 1,4 yield, upon hydrogenation, unsubstituted polyethylene sequences. Those units which enter the polymeric block via 1,2 polymerization yield ethyl-substituted ethylene units upon hydrogenation. The 1,2 content is advantageously in the range of 5–30%, preferably 10–20%.

After the polymerization has proceeded to the desired extent, the resultant cement may be used as such in a hydrogenation treatment. Or the diene block copolymer may be isolated by any standard technique such as by a slurry operation wherein the reaction solution is run into a reactor containing hot water to flash off unreacted monomer, terminate polymerization, and afford a slurry of the polymeric product which is then filtered and the product dried in conventional drying equipment. Alternatively, the reaction mixture may be introduced into a hot aromatic or aliphatic hydrocarbon solvent to flash off unreacted monomer and terminate polymerization. The resulting polymer-containing solution may then be isolated by passing it into a vacuum chamber where the solvent is evaporated or flashed off. This technique affords strands or pellets of the polymer. Or the polymeric solution may simply be dumped into a large column of methanol or isopropanol to kill the catalyst and precipitate the polymer. If desired, an antioxidant may be present in such diluent.

The hydrogenation of the vinyl aromatic hydrocarbon-diene diblock copolymer to prepare the copolymers of this invention may be carried out by a variety of methods. The hydrogenation may be effected by placing the diene diblock copolymer in a hydrocarbon solution in the presence of a suitable catalyst and applying hydrogen gas under pressure to this solution. The method may be either continuous or a batch process.

The diblock polymer concentration may vary between about 0.5 percent to about 30 percent by weight of the hydrocarbon solution and is preferably within a range of about 2 percent to about 20 percent.

Suitable solvents include saturated cyclic hydrocarbons, such as cyclohexane, methylcyclohexane, decalin, and the like, preferably boiling above atmospheric temperature. Aromatic hydrocarbons, such as benzene and toluene; cyclic ethers, such as dioxane; and paraffinic hydrocarbons such as isooctanes, isoheptanes, and normal heptane; hydroaromatic hydrocarbons such as tetralin and the like, can also be used. Mixtures of solvents and/or dispersants can be used if desired.

In one embodiment, after the polymer has been dissolved in the solvent, the hydrogenation catalyst is added, hydrogen is added, and the temperature raised to a suitable level to initiate the reaction. Either the catalyst or the solution of polymer can be added in increments after the reaction temperature has been reached. This operation can be carried out in a batch-wise or a continuous process. When sufficient hydrogenation has been effected, usually indicated by a decrease in unsaturation or a drop in hydrogen pressure, the reaction is stopped and the dispersion or solution treated by suitable means, such as by filtering, centrifuging, and the like, to remove the catalyst. Magnetizable catalysts can be removed very advantageously by passing the solution or dispersion after hydrogenation through a packing which has been energized with a high field flux by either permanent or electro-magnets.

In the hydrogenation step any catalyst may be used which is capable of converting aliphatic unsaturation to saturated product. Catalysts such as finely divided, supported and unsupported nickel, for example, nickel-on-kieselguhr, have been found to be very effective. The quantity of catalyst may be varied within a range of from about 0.1 to about 400 percent by weight of the polymer used. In commercial applications, it is desirable to keep down the residence time of the hydrogenation which may be achieved by high catalyst to polymer ratios. When the catalyst is used in high concentrations with respect to the polymer, it must of course be separable from the fully hydrogenated product for reuse as a catalyst.

The diene diblock copolymers can be hydrogenated for the purpose of this invention using the following ranges of reaction conditions. The concentration of copolymers to be hydrogenated may be from 1 to 30%, preferably from 1 to 20% by weight. As shown in the examples, excellent hydrogenation efficiency is obtained by hydrogenation of a solution containing 10-20% of the block copolymers carried out at room temperature to 350° C, or even higher, preferably room temperature to 150° C, under hydrogen pressure from 1 atmosphere to 100 atmospheres, preferably 2-20 atmospheres. Reaction periods in the range of 0.5 to 24 hours, preferably 2 to 8 hours, can be employed. In the usual case, no further hydrogenation takes place after 2 or 3 hours. The amount of catalyst required is also a function of the temperature of hydrogenation. That is to say, 10 percent by weight of catalyst at 200° C produces approximately the same effect that 15 percent gives at 150° C.

In order to obtain polymers of the desired characteristics, the aliphatic unsaturation should be reduced to a value of approximately 0 to 20 percent, based upon the theoretical value of 100 percent for the unhydrogenated butadiene polymer. Preferably the residual aliphatic unsaturation in the products should be less than 10 percent. The value desired within this preferred range depends upon the use to which the particular hydrogenated material is to be put. If the hydrogenated material is to be vulcanized, the residual unsaturation should be within the range of 15 to 20 percent, vulcanization being difficult when the polymer has an unsaturation below 10 and being almost impossible when this value is below 5. Materials having good ozone resistance are produced when the unsaturation is kept below 20 percent, this result being apparent both before and after vulcanization. However, if the residual unsaturation is above 20, particularly if there is no vulcanization, the high unsaturation results eventually in oxidation to hard, brittle products and therefore have poor aging properties. Consequently, the residual aliphatic unsaturation is desirably maintained below 20 percent, and preferably below 10 percent.

Hydrogenation of the styrene aromatic ring requires higher temperatures and pressures so that substantially complete hydrogenation of the aliphatic unsaturation may be effected before substantial hydrogenation of the aromatic unsaturation is effected. However a substantial amount of hydrogenation of the aromatic unsaturation may be effected without adversely affecting the results of the present invention.

After the hydrogenation, removal of solvent and catalysts from the hydrogenated hydrocarbon polymers is easily carried out by adding polar solvent such as acetone and alcohol to the reaction mixtures and precipitating the polymers, or by pouring the reaction products into hot water and removing solvent by azeotropic distillation. In these procedures, catalysts are decomposed and the major part of them is removed from the polymers, but the most effective removal of the catalysts is attained by contacting the reaction mixtures with a polar solvent containing a small amount of acid.

The butadiene unit has the formula:

and/or

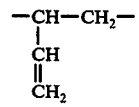

The hydrogen-saturated butadiene unit has the formula:

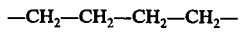

and/or

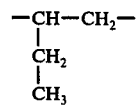

The oil-extended hydrogenated diblock copolymers of this invention may be utilized for a wide variety of molding operations using apparatus normally employed for the molding of thermoplastic, particularly for making rubber hose, shoe soles, tires, industrial and automobile goods, etc. The copolymers may be modified with flow assisting agents. It is preferred, however, to restrict the proportions of these agents so as to maintain maximum stress-strain properties in the finished compositions. Fillers may be employed if desired, such as those utilized with ordinary rubbers. They may be further modified by the presence of asphalt, wax, polyvinyl compounds such as polystyrene, ordinary polymers of alpha-olefins such as polypropylene or polyethylene or may be mixed with either natural or synthetic rubbers such as polyisoprene and polybutadiene.

The viscosities reported herein and used for molecular weight determinations are dilute solution viscosity (DSV). The dilute solution viscosity is defined as the inherent viscosity determined at 25° C on a 0.4% solution of the polymer in toluene. It is calculated by dividing the natural logarithm of the relative viscosity by the percent concentration of the solution, i.e., it is the inherent viscosity measured at 0.4% concentration. The hydrogenated diblock copolymer of this invention has DSV in the range of 0.3 to 6.5, preferably 0.37 to 4.0, which corresponds to average molecular weights of about 15,000 to 1,000,000, preferably about 20,000 to 500,000.

The amount of oil used to extend the hydrogenated diblock copolymer is 10-200 parts by weight, preferably 25-125 parts by weight per 100 parts of copolymer. Other modifiers, such as fillers, may also be present up to 300 parts by weight per 100 parts of copolymer.

The oil may be any commercial paraffinic, aromatic or naphthenic mineral oil or mixtures thereof. While these are generally of petroleum derivation, coal tar oils are also suitable. Preferably the oil should have a boiling point of not below 450° F, preferably not below 550° F; a Saybolt viscosity of 35-150 seconds at 212° F, preferably 35-140 seconds; and a specific gravity of 0.80 to 1.10, preferably 0.95 to 1.05. The oil used in the following examples has an SSU viscosity at 212° F of 38 seconds; a specific gravity of 0.91 and a pour point of −30° F. BIT distillation shows 5% distills at 600° F; 10% at 631° F; 50% at 691° F and 90% at 788° F. The oil comprises 20% aromatic, 29% napthenic and 51% paraffinic.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

PREPARATION OF DIENE DIBLOCK COPOLYMER

The starting diene diblock copolymer is prepared in a stainless steel reactor equipped with a stirrer, a temperature control means, and inlet and outlet means. A blend of butadiene and hexane containing about 25% butadiene is introduced, following which a solution of n-butyl lithium is added. The butadiene blend has been pretreated or is selected so as to be free of any traces of materials that will react with or poison the initiator. The amounts of butadiene and initiator are selected to give the desired molecular weight for the ultimate polybutadiene block of the diene diblock copolymer. This is calculated by the formula:

Molecular weight = Grams butadiene/moles of n-BuLi

The temperature is raised to 55° C and polymerization is completed at the end of 2 hours. Then the temperature is raised to 110° C; a butadiene/styrene/hexane blend, containing butadiene and styrene in the ratio desired in the random copolymer block, is fed gradually into the reactor over a period of 2 to 3 hours. More rapid feeding is avoided so as to avoid the formation of a terminal polystyrene block. Polymerization is continued for about 10-15 minutes after the addition of blend has been completed. The amount of butadiene and styrene thus added is calculated on the basis of the molecular weight desired for the random copolymer block of the diene copolymer block and according to the number of moles of polybutadiene-Li present when the feeding of the mixed monomer blend is initiated. Here again, the monomer blend is pretreated or selected to avoid the presence of any catalyst poisons. The reaction mass is cooled to room temperature in a sealed container or retained in the reactor in an appropriate amount for hydrogenation as described in Example II.

EXAMPLE II

HYDROGENATION OF DIENE BLOCK COPOLYMER

To a 50 lb. charge of the base copolymer prepared in Example I and contained in the same reactor used in Example I, or in a similar reactor, there is added 40 lbs. of additional hexane to reduce the solution viscosity. The temperature is then raised to 105° C and about 10 lbs. of the hexane is distilled off to insure that all possible traces of moisture are removed. The hydrogenation catalyst (Ni octoate/cyclohexene/triethylaluminum in 1/1/3 ratio) is added in an amount to give 0.01 moles of Ni octoate per 100 grams of diene copolymer. Hydrogen is introduced and a hydrogen pressure of 150 psig maintained at 105° C for 10 hours. The polymer is then substantially completely saturated at that time. The reaction solution is then dropped under a nitrogen atmosphere into a drum containing methanol and anti-oxidant and mixed well to give a precipitate of the hydrogenated diblock copolymer.

EXAMPLE III

An oil-extended hydrogenated diblock copolymer of this invention is prepared starting with the procedures of Examples I and II in which the product has an overall molecular weight of about 100,000 with the polybutadiene block being equivalent to a molecular weight of 30,000 and the random copolymer block being equivalent to a molecular weight of 70,000. The random copolymer block has a styrene content of 50%. This is compared in a number of properties with a hydrogenated random copolymer of butadiene and styrene and a hydrogenated polybutadiene. The results are tabulated below with diblock copolymer properties comparing very favorably even with higher molecular weights in the other polymers.

|  | Hydrogenated Random Copolymer | Hydrogenated Polybutadiene | Hydrogenated Diblock |
|---|---|---|---|
| Molecular Weight | 120,000 | 150,000 | 100,000 |
| Styrene (%) | 28.1 | 0 | 36.2 |
| Ml$_4$/100° C | 26 | 31 | 35 |
| % Hydrogenated | 90 | 90 | 90 |
| Melting Point (° C) | 60 | 102 | 103 |
| Swelling Index (%) | 1200 | 18 | 275 |

-continued

|  | Hydrogenated Random Copolymer | Hydrogenated Polybutadiene | Hydrogenated Diblock |
|---|---|---|---|
| Properties When Compounded* | | | |
| Tensile Strength (Psi) | | | |
| 70° F | 1000 | ** | 920 |
| 150° F | 20 | ** | 120 |
| Elongation (%) | | | |
| 70° F | 865 | ** | 660 |
| 150° F | 30 | ** | 295 |

*Compounding Recipe:
  Polymer 100 parts
  Mineral Oil 80 parts
  Whitex clay 70 parts
  Polyethylene 20 parts
**could not be compounded because of too much bleeding of oil.

EXAMPLE IV

An oil-extended hydrogenated diblock copolymer of this invention is prepared starting with the procedures of Examples I and II. This is compared in properties to a hydrogenated random copolymer of butadiene and styrene presently available commercially for shoe sole compounding. The results are tabulated below:

|  | Random Copolymer | Hydro-Diblock |
|---|---|---|
| DSV | 1.4 | 1.2 |
| % Styrene | 25 | 35 |
| % Hydrogenation | 90 | 100 |
| Melting Pt. (° C) | 44-76 | 102 |
| Heat & Aging Stability | Excellent | Excellent |
| Tensile Strength (Elongation)*: | | |
| 72° F (psi, %) *† | 1000 | 920 (66) |
| 125° F (psi, %) | 70 (200) | 200 (890) |
| 150° F (psi, %) | 20 (30) | 120 (300) |
| 300% Modulus (72° F), psi | 250 | 380 |
| Ross Flex (k cycle) | 100 | 200 |
| Capillary Extrusion | | |
| Sheer Stress (psi, 400° F) | 27.5 | 21.5 |
| Gehman Freeze Point (° F) | −70 | −65 |
| Shore A Hardness | 66 | 71 |

*Compounding Recipe:
  100 parts polymer; 80 parts mineral oil;
  70 Whitex clay; 20 LDPE 0053**; and 10 Titanox
**LDPE 0053 is a low molecular weight polyethylene used as a processing aid.

EXAMPLE V

The procedures of Examples I, II and III are repeated a number of times with similar results, varying the proportions and types of diene and vinyl arene to give, in each case, a diblock copolymer having the desired proportions:

(a) Polybutadiene block is equal to 40% of total diblock; random copolymer block contains 50% styrene and 50% butadiene; and overall molecular weright of diblock is 20,000;

(b) Polybutadiene block is equal to 50% to total diblock; random copolymer block contains 50% styrene and 50% butadiene; and overall molecular weight of diblock is 50,000;

(c) Polybutadiene block is equal to 70% of total diblock; random copolymer block contains 30% vinyl toluene and 70% butadiene; and overall molecular weight of diblock is 100,000.

(d) Polybutadiene block is equal to 60% of total diblock; random copolymer block contains 50% styrene and 50% butadiene; and overall molecular weight of diblock is 40,000;

(e) Polybutadiene block is equal to 50% of total diblock; random copolymer block contains 40% alphamethylstyrene and 60 butadiene; and the overall molecular weight of the diblock is 30,000.

EXAMPLE VI

A series of experiments are performed using the procedures of Examples I and II to give a series of block copolymers having an initial polybutadiene block representing 35% of the copolymer and the remaining 65% is essentially a random copolymer consisting of 55 percent butadiene and 45 percent styrene. The amount of terminal block polystyrene is varied and this amount is controlled by the rate of addition of the mixture of butadiene and styrene monomers, with the amount of block polystyrene being increased by increasing the rate of addition of monomer mixture. The results are given in the following table:

Table

| Experiment No. | 70 | 83 | 86 | 95 | 69 | 81 | 96 |
|---|---|---|---|---|---|---|---|
| Dil. Sol. Visc. | 0.9 | 1.06 | 1.22 | 1.03 | 1.2 | 1.01 | 1.1 |
| Block Polystyrene (%) | 0 | 0 | 3 | 3.4 | 4.4 | 11.01 | 23.5 |
| Block Polybutadiene (%) | 35 | 35 | 35 | 35 | 35 | 35 | 35 |
| % Hydrogenation (of aliphatic unsaturation) | 100 | 100 | 100 | 100 | 100 | 100 | 100 |
| Melting Temp. ° C | 105 | 104 | 104 | 103 | 103 | 101 | 98 |
| Swelling Index (%) | 300 | 195 | 170 | 220 | 165 | 140 | 71.5 |
| Oil Extendability | | | | | | | |
| Physical Properties of Compounded Mixture* | | | | | | | |
| Tensile Strength: | | | | | | | |
| 70° F (psi) | 220 | 330 | 320 | 390 | 715 | 490 | |
| 150° F (psi) | 55 | 90 | 80 | 80 | 115 | 100 | |

Table-continued

| Experiment No. | 70 | 83 | 86 | 95 | 69 | 81 | 96 |
|---|---|---|---|---|---|---|---|
| Shore A Hardness | 65 | 70 | 70 | 70 | 70 | 71 | |

*Compounding Recipe:
  Polymer 100 parts
  Mineral Oil 80 parts
  Whitex Clay 70 parts
  Polyethylene 20 parts
  Titania 20 parts
*Initial block polybutadiene Also, a true comparison should be made with copolymers of the same molecular weights. It would be difficult to make copolymers of identical molecular weight or DSV. Therefore the above experiments were selected where the molecular weights are only approximate. Experiments 83, 95 81 and 96 are almost identical in DSV, whereas Experiment 70 has a molecular weight somewhat lower, thereby accounting for the lower tensile strength. Experiments 86 and 69 have higher molecular weights which accounts for decrease in swelling index or oil extendability. In Experiment 81 and, particularly in Experiment 96, the higher percentages of block polystyrene show their effect in lowering the swelling index or oil extendability.

In comparison with commercially available shoe sole materials of other types, the oil-extended hydrogenated diblock copolymers of this invention compare very favorably in properties important for this purpose. For example, the hydrogenated diblock copolymer of Example IV can be extended with 80 parts of mineral oil and 70 parts of clay to give the good high temperature tensile strengths and flow properties (capillary extrusion sheer stress) shown in that example. In contrast, a material commercially available for use in shoe soles, which comprises a multiblock butadiene-styrene copolymer (S—B—S) has poor heat stability and aging properties as compared to the excellent heat stability and aging properties of the diblock copolymer of this invention. The higher oil and clay extendability of the product of this invention is an important factor in price and quality of the copolymer of this invention for this particular purpose.

Moreover, as indicated above, the hydrogenated diblock copolymer of this invention has improved high temperature tensile strengths as compared to another material available for shoe soles comprising the hydrogenated butadiene-styrene random copolymer shown in Example III. As shown in the table of that example, the hydrogenated diblock copolymer of this invention has a tensile strength of 120 psi at 150° F in contrast to the 20 psi value for the other material.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. An oil-extended diblock copolymer composition comprising 10-200 parts by weight of oil and 100 parts by weight of a hydrogenated diene-styrene diblock copolymer consisting essentially of 20-70 percent by weight of a block of hydrogenated polybutadiene and 30-80 percent by weight of a block of hydrogenated random copolymer of 20-50 percent by weight of a vinyl arene substantially uniformly distributed throughout said block and 50-80 percent by weight of 1,3-butadiene, said diblock copolymer having an average molecular weight of 15,000–1,000,000 determined by viscosity measurement, the amount of residual aliphatic unsaturation in said hydrogenated diblock copolymer being less than 20% of the original aliphatic unsaturation, and the 1,2-microstructure content of the butadiene in the copolymer is 5–30 percent.

2. An oil-extended copolymer of claim 1 in which said vinyl arene is styrene.

3. The oil-extended copolymer of claim 2 in which said vinyl arene is alphamethylstyrene.

4. The oil-extended copolymer of claim 2 in which said vinyl arene is vinyl toluene.

5. The oil-extended copolymer of claim 2 in which said copolymer has a molecular weight of 20,000–500,000.

6. The oil-extended copolymer of claim 1 in which said hydrogenated polybutadiene block represents 40–70 percent by weight of said copolymer.

7. The oil-extended copolymer composition of claim 1 in which the relative proportion of butadiene and styrene is maintained relatively uniform throughout the length of the random copolymer block by conducting the copolymerization in a reactor maintained at the desired polymerization conditions while a monomer feed of the proportions of butadiene and styrene as desired in the random copolymer block is introduced into the reactor at a rate well below the polymerization rate of the mixture at the polymerization conditions being used.

8. The oil-extended copolymer composition of claim 7 in which the monomer feed rate is less than one-half the polymerization rate for the particular conditions being used.

9. The oil-extended copolymer composition of claim 1 in which the relative proportion of butadiene and styrene is maintained relatively uniform throughout the length of the random copolymer block by adding all the styrene initially to the polymerization system and adding the butadiene thereto at a rate slightly under the rate at which the butadiene is polymerized under the polymerization conditions.

10. The oil-extended copolymer composition of claim 1 comprising 25–125 parts by weight of oil and 100 parts by weight of said hydrogenated diblock copolymer.

11. The oil-extended copolymer composition of claim 1 in which said block of random copolymer is a hydrogenated random copolymer of about 55% butadiene and 45% styrene.

* * * * *

UNITED STATES PATENT OFFICE
CERTIFICATE OF CORRECTION

Patent No. 4,102,849　　　　　　　　　Dated July 25, 1978

Inventor(s) Thomas Chester Bouton and Shingo Futamura

It is certified that error appears in the above-identified patent and that said Letters Patent are hereby corrected as shown below:

Column 9, Example IV, line 29
　　in the table, the column headed "Random Copolymer"
　　should read -- Hydrogenated Randon Copolymer --

In the Same Table, the column headed "Hydro- Diblock"
　　should read -- Hydrogenated Diblock --

Signed and Sealed this

Second Day of October 1979

[SEAL]

Attest:

RUTH C. MASON
Attesting Officer

LUTRELLE F. PARKER
Acting Commissioner of Patents and Trademarks